US012284931B2

(12) United States Patent
Appert et al.

(10) Patent No.: US 12,284,931 B2
(45) Date of Patent: Apr. 29, 2025

(54) METHOD FOR CONTROL BY A SUPERVISOR OF AT LEAST ONE AUTONOMOUS AGRICULTURAL ROBOT COMPRISING GEOLOCATION MEANS

(71) Applicant: Agreenculture, Ramonville-Saint-Agne (FR)

(72) Inventors: Henri Appert, Toulouse (FR); Emmanuel Goua de Baix, Colomiers (FR); Clément Baron, Toulouse (FR)

(73) Assignee: AGREENCULTURE, Ramonville-Saint-Agne (FR)

( * ) Notice: Subject to any disclaimer, the term of this patent is extended or adjusted under 35 U.S.C. 154(b) by 184 days.

(21) Appl. No.: 17/756,754

(22) PCT Filed: Dec. 3, 2020

(86) PCT No.: PCT/FR2020/052273
§ 371 (c)(1),
(2) Date: Jun. 1, 2022

(87) PCT Pub. No.: WO2021/111085
PCT Pub. Date: Jun. 10, 2021

(65) Prior Publication Data
US 2023/0104748 A1    Apr. 6, 2023

(30) Foreign Application Priority Data
Dec. 3, 2020 (FR) .................................... 1913655

(51) Int. Cl.
*A01B 69/00* (2006.01)
*A01B 69/04* (2006.01)
(Continued)

(52) U.S. Cl.
CPC ......... *A01B 69/008* (2013.01); *G05D 1/0212* (2013.01); *G05D 1/0297* (2013.01);
(Continued)

(58) Field of Classification Search
CPC .. A01B 69/008; G05D 1/0212; G05D 1/0297; G05D 1/221; G05D 1/43;
(Continued)

(56) References Cited

U.S. PATENT DOCUMENTS

| 2008/0249692 | A1* | 10/2008 | Dix ...................... | A01B 69/008 |
| | | | | 701/50 |
| 2010/0185366 | A1* | 7/2010 | Heiniger .............. | A01B 69/008 |
| | | | | 700/12 |

(Continued)

FOREIGN PATENT DOCUMENTS

FR        3042943 B1     11/2017

OTHER PUBLICATIONS

H. Wang and N. Noguchi, "Autonomous maneuvers of a robotic tractor for farming," 2016 IEEE/SICE International Symposium on System Integration (SII), Sapporo, Japan, 2016, pp. 592-597, doi: 10.1109/SII.2016.7844063. (Year: 2016).*

(Continued)

*Primary Examiner* — Anne Marie Antonucci
*Assistant Examiner* — Jordan T Smith
(74) *Attorney, Agent, or Firm* — Ware, Fressola, Maguire & Barber LLP

(57) ABSTRACT

The invention relates to a method for control by a supervisor of at least one autonomous agricultural robot comprising geolocation means, the supervisor transmitting periodic row allocation messages to the at least one autonomous agricultural robot, each of the agricultural robots comprising a computer for controlling the movement of the corresponding robot as a function, on the one hand, of the allocated trajectory and, on the other hand, of the geolocation data, as well as for calculating a row change trajectory as a function of the messages transmitted by the supervisor.

14 Claims, 2 Drawing Sheets

(51) Int. Cl.
   *G05D 1/00*   (2006.01)
   *G05D 1/221*  (2024.01)
   *G05D 1/43*   (2024.01)
   *G05D 1/646*  (2024.01)
   *G05D 1/229*  (2024.01)
   *G05D 1/69*   (2024.01)
   *G05D 105/15* (2024.01)

(52) U.S. Cl.
   CPC .............. *G05D 1/221* (2024.01); *G05D 1/43* (2024.01); *G05D 1/646* (2024.01); *G05D 1/2295* (2024.01); *G05D 1/69* (2024.01); *G05D 2105/15* (2024.01)

(58) Field of Classification Search
   CPC ........ G05D 1/646; G05D 1/2295; G05D 1/69; G05D 2105/15; G05D 1/0217; G05D 1/0219
   See application file for complete search history.

(56) References Cited

U.S. PATENT DOCUMENTS

| | | | |
|---|---|---|---|
| 2015/0198953 | A1 | 7/2015 | Peake et al. |
| 2017/0188505 | A1 | 7/2017 | Potier et al. |
| 2017/0354079 | A1* | 12/2017 | Foster .................. G05D 1/0276 |
| 2018/0084710 | A1* | 3/2018 | Lawson ................ B62D 15/025 |
| 2018/0359905 | A1 | 12/2018 | Foster et al. |
| 2019/0227561 | A1* | 7/2019 | Hiramatsu ........... G05D 1/0278 |
| 2021/0267115 | A1* | 9/2021 | Fjelstad ............... G05D 1/0257 |

OTHER PUBLICATIONS

International Search Report for International Application No. PCT/FR2020/052273 dated Mar. 1, 2021, 2 pages.

International Written Opinion for International Application No. PCT/FR2020/052273 dated Mar. 1, 2021, 7 pages.

* cited by examiner

METHOD FOR CONTROL BY A SUPERVISOR OF AT LEAST ONE AUTONOMOUS AGRICULTURAL ROBOT COMPRISING GEOLOCATION MEANS

CROSS REFERENCE TO RELATED APPLICATIONS

This application is the U.S. National Stage of International Application Number PCT/FR2020/052273 filed on Dec. 3, 2020, which application claims priority under 35 USC § 119 to French Patent Application No. 1913655 filed on Dec. 3, 2019. Both applications are hereby incorporated by reference in their entirety.

FIELD OF THE INVENTION

The present invention relates to the field of Precision Land Management (PLM) implementing autonomous agricultural robots, and more particularly the automatic maneuver sequencing function at the headland, for working crop rows. These maneuvers are relatively delicate because the maneuvering area, substantially perpendicular to the crop rows, must be as narrow as possible to avoid the loss of cultivable area, and requires the operator to be very precise in moving to the next row with perfect alignment, without "biting into the boundaries of the maneuvering area. This operation is all the more delicate since the agricultural machine is often equipped with a very wide tool, offset behind the center of rotation of the machine, which involves extrapolating the movements of the points furthest from the work tool. In addition, it is desirable to limit movements in the maneuvering area to avoid damaging the ground.

BACKGROUND OF THE INVENTION

In the field of precision agricultural machinery, solutions are beginning to be developed for assisting the driver of the machine. For example, the TERRA DOS T4 sugar beet harvester from the company HOLMER (trade names) can be equipped with a SMART CONTROL module from the company REICHHARDT (trade names) performing GNSS driving to record the planting and field boundaries as well as other parameters. The headland U-turn control raises the harvesting unit and puts it back in place. At the end of the row, the system uses an audible signal to automatically indicate the optimum moment to initiate the U-turn that the driver is actively starting. The module then controls the stopping of the harvesting at the boundary of the plot and raises the harvesting unit at the optimum point.

At the same time, the GNSS (GPS) driving takes charge of the U-turn, which makes it possible to carry out an ideal maneuver. The system automatically drives in the nearest correct lane.

Once arrived, the module automatically relocates the harvesting unit to the optimum point in the field. Finally, the certified row sensor control system drives the machine on the row. The necessary waypoints are calculated in the module. The CAN-Bus transfers the waypoints to the driving computer, which retransmits the calculated U-turn movements to the vehicle controller.

The recorded data makes it possible to calculate the trajectory during U-turns, row changes or withdrawal paths as well as to virtually count the trajectories. All operational procedures are optimized and fully automated. In the absence of this data, navigation information is collected during harvesting. In addition, automatic and continuous calculations are done for the next headland path, in order to optimize the driving behavior at the headland (headland width, entry conditions in the next row, etc.) based on the row sensor trajectory data. Finally, all impact-specific data are stored and made available to the farmer, who can document and evaluate them.

This solution minimizes the pressure on the ground, since unnecessary journeys are avoided, crop losses are reduced, owing to the automatic use and lifting of the harvesting unit. In addition, idle times and variable costs are reduced, since for example it is no longer necessary to count rows (a costly procedure).

A similar solution is marketed under the name INTELLITURN from the company NEWHOLLAND (trade names).

This auto-steering feature improves machine profitability by automatically planning and executing a highly efficient turn, minimizing downtime during turns and ensuring that the tool enters the next line according to the desired trajectory, without the need for driver intervention.

PRIOR ART

Patent application US2017/188505 (French patent FR3042943) is known in the state of the art describing a system capable of managing maneuvers fully automatically or semi-automatically, in particular U-turns, that is independent of the tractor, usable with tractors with or without on-board intelligence and able to manage U-turn maneuvers, with prediction of trajectories for motorized agricultural attachments indifferently comprising one to three pieces of equipment hitched to a tractor.

This solution of the prior art requires the processing of a large number of stated parameters and variables:
 The angle at which the tractor deviates from the initial direction;
 The speed coefficient linked to the tractor;
 The wheelbases of the tractor element and of a hitched element;
 The steering angle of the tractor;
 The bending angles of two successive hitched elements;
 The coordinates of the trajectory of the tractor;
 The coordinates of the center of the circular trajectory;
 The turning radius;
 The angle formed by the axis linking the kinematic center of a tractor element with the instantaneous center of rotation and the axis linking the coupling bridge with this center of rotation;
 The direct mechanical connection ratio of the elements;
 Interactions with the ground.

These are data that may present acquisition errors and for some are interdependent, and are determined in relation to several coordinate systems that are not all linked.

Trajectory optimization algorithms based on such a wide variety of parameters, partly interrelated, are not stable and can lead to inappropriate solutions. This document also specifies that "The operator is able to deactivate the system for management and guidance of the maneuvers at the end of the path in order to correct for any drift that may have occurred."

Also known in the state of the art is US patent application US2018/359905 describes a control solution for an agricultural work vehicle system comprising:
 a controller configured to:
 receive a set of swath paths;
 separate each swath path of the set of swath paths into a set of half-swaths;

determine a plurality of possible connecting paths, wherein each connecting path of the plurality of possible connecting paths connects a half-swath of a first half-swath of the set of half-swaths to a second half-swath of the set of half-swaths;

determine a cost for each possible connecting path of the plurality of possible connecting paths;

select a chosen connecting path from the multiple possible connecting paths based on the cost; and output a signal indicative of a travel path for an agricultural work vehicle.

This solution is sensitive to positioning errors and the orientation of the vehicle position measurement point and also requires acquiring a large amount of data: "The sensor assembly is configured to facilitate determination of conditions of the vehicle, for example, infrared sensors, ultrasonic sensors, magnetic sensors, etc.) configured to monitor a rotation rate of a respective wheel or track and/or a ground speed of the work vehicle. The sensors may also monitor operating levels (e.g. temperature, fuel level, etc.) of the work vehicle. Furthermore, the sensors may monitor conditions in and around the field, such as temperature, weather, wind speed, humidity, objects in the field, and other such conditions." The quality of guidance is strongly linked to the consistency and precision of these multiple data.

Also known is application US2015/198953 describing another vehicle autopilot solution aimed at offering high-performance guidance, whether the vehicle is close to or far from a desired trajectory, to maintain a vehicle on a trajectory, and to guide it effectively to join a trajectory from any starting point. Joining paths are calculated assuming a constant vehicle speed. Joining paths can be recalculated each time the speed changes or they can be recalculated periodically whether or not the vehicle speed has changed.

Joining paths are constructed as a series of linear, circular, and clothoid segments. Spirals are used to join segments of different and constant curvature, for example to join a line and an arc of a circle.

This solution imposes limitations: the speed must be assumed to be constant, otherwise the calculation must be restarted at each change of speed. However, the speed varies continuously in the case of an agricultural vehicle moving on uneven ground.

SUMMARY OF THE INVENTION

The present invention aims to remedy these drawbacks by means of a robust solution limiting the number of data necessary to calculate the optimum trajectory and making it possible to determine, in real time, the corrective actions allowing optimal monitoring of a theoretical trajectory.

It relates in its most general sense to a method for control by a supervisor of at least one autonomous agricultural robot comprising geolocation means, said supervisor transmitting periodic row allocation messages to said at least one autonomous agricultural robot, each of said agricultural robots comprising a computer for controlling the movement of the corresponding robot as a function, on the one hand, of the allocated trajectory and, on the other hand, of the geolocation data, as well as for calculating a row change trajectory as a function of the messages transmitted by said supervisor, Characterized in that:

Said supervisor transmits a digital message describing the boundaries of the maneuvering area consisting of at least one polygon; and in that the method comprises calculating the movement of said robot a) when moving on a row by a guiding law by minimizing the deviation between
   the center of the robot
   the projection of the center of the robot on the row b) when moving outside a row during use by a guiding law by minimizing the deviation between
   the center of the robot
   the projection of the center of the robot on a maneuvering path said maneuvering path being determined by constrained optimization of the maneuvering trajectory, said constraints comprising:
   the orientation of the end of the maneuvering path corresponds to the orientation of the start of the next row
   the area traveled by the set of mobile elements is strictly inscribed in said maneuvering polygon
   the optimization criterion consisting of the weighted combination of at least part of the following parameters:
   minimizing the travel time of said maneuvering path
   maximizing turning radii
   minimizing the cultivation surface crossed by the bearing surface on the ground generated by the movement of the robot on said maneuvering path.
   conformity to a typology of a preferred trajectory from a library of typologies.

This library contains, for example, the recording of digital data for the definition of a "K" bend, a "U" bend or any other usual bend typology.

According to a variant, the method further comprises a digital message further describing at least one maneuvering route consisting of a succession of segments $S_i$ each defined by a downstream point $PAV_i$, an upstream point $PAM_i$ corresponds to the point $PAV_{i+1}$ of the following segment $S_{i+1}$, said optimization criterion for minimizing the cultivation surface crossed being determined as a function of the deviation between the maneuvering path and the maneuvering route.

Advantageously, said trajectory during movement outside the row is a function of the following parameters:
   the tangent to the exit row
   the tangent to the allocated row
   said maneuvering path
   boundaries of the authorized movement area.

According to a variant, said trajectory during movement outside the row comprises at least one inversion of the movement direction.

Advantageously, said trajectory during movement outside the row is calculated to present at least one asymptote close to the boundary of the authorized movement area.

Within the meaning of this patent, "close" means a distance at least two times less than the width of the tool towed by the self-guided machine.

Advantageously, said trajectory during movement outside the row is calculated to maximize the distance between the asymptotes of said trajectory and the boundary of the authorized movement area.

According to a variant, said trajectory during movement outside the row is calculated to minimize the length of said trajectory.

According to another variant, said trajectory during movement outside the row is calculated to maximize the radii of curvature of said trajectory Preferably, said supervisor transmits a plurality of maneuvering paths and in that the robot selects one of said maneuvering paths during the step of calculating said U-turn trajectory.

According to a variant, said computer for controlling the movement of the robot comprises a controller determining, in real time, the direction and the speed of movement as a function of the offset between said reference point and the calculated trajectory, with different coefficients for the movement on a row on the one hand, and for movement outside a row on the other hand.

Advantageously, said coefficients are adjusted according to the use of the tool and the nature of the ground.

The invention also relates to a precision land management system comprising a supervisor and at least one autonomous agricultural robot comprising geolocation means, characterized in that said supervisor comprises a computer for calculating periodic row allocation messages for each of said agricultural robots and a digital representation of at least one maneuvering path, and communication means for transmitting said periodic messages and said digital representation to said at least one autonomous agricultural robot, each of said agricultural robots comprising its own geolocation means and a computer to control the movement of the corresponding robot as a function, on the one hand, of the allocated trajectory and, on the other hand, of the geolocation data, as well as to calculate a row change trajectory as a function of the messages transmitted by said supervisor, the computer of each of said at least one robot being configured to calculate the movement of said robot
   a) when moving on a row by a guiding law by minimizing
      the deviation between
      the center of the robot
      the projection of the center of the robot on the row
   b) when moving outside a row during use by a guiding law by minimizing the deviation between
      the center of the robot
      the projection of the center of the robot on a maneuvering path
   said maneuvering path being determined by constrained optimization of the maneuvering trajectory, said constraints comprising:
      the orientation of the end of the maneuvering path corresponds to the orientation of the start of the next row
      the area traveled by the set of mobile elements is strictly inscribed in said maneuvering polygon
   the optimization criterion consisting of the weighted combination of at least part of the following parameters:
   minimizing the travel time of said maneuvering path
   maximizing turning radii
   minimizing the cultivation surface crossed by the bearing surface on the ground generated by the movement of the robot on said maneuvering path.
   compliance with a typology of a preferred trajectory from a library of typologies, for example "K" bend, "U" bend, bend described by a succession of arcs, straight segments and cusps, in particular in the form of triplets of arcs and/or rectilinear segments and associated with a number between 0 and 2 designating the number of elements (arc or rectilinear segment) traveled in reverse.

The invention also relates to an autonomous agricultural robot comprising its own geolocation means, a computer for controlling the guidance as a function of information coming from said geolocation means and communication means for receiving information transmitted by a remote supervisor, characterized in that said information transmitted by said supervisor comprises periodic row allocation messages from each of said agricultural robots and a digital representation of at least one maneuvering path, said computer being configured to control the movement of the corresponding robot as a function of the allocated trajectory on the one hand and geolocation data on the other hand, as well as to calculate a row change trajectory as a function of the messages transmitted by said supervisor,
   a) when moving on a row by a guiding law by minimizing
      the deviation between
      the center of the robot
      the projection of the center of the robot on the row
   b) when moving outside a row during use by a guiding law by minimizing the deviation between
      the center of the robot
      the projection of the center of the robot on a maneuvering path
   said maneuvering path being determined by constrained optimization of the maneuvering trajectory, said constraints comprising:
      the orientation of the end of the maneuvering path corresponds to the orientation of the start of the next row
      the area traveled by the set of mobile elements is strictly inscribed in said maneuvering polygon
   the optimization criterion consisting of the weighted combination of at least part of the following parameters:
   minimizing the travel time of said maneuvering path
   maximizing turning radii
   minimizing the cultivation surface crossed by the bearing surface on the ground generated by the movement of the robot on said maneuvering path.
   conformity to a typology of a preferred trajectory from a library of typologies The invention also relates to a supervisor of autonomous agricultural robots comprising geolocation means, characterized in that it comprises a computer for calculating periodic row allocation messages from each of said agricultural robots and a digital representation of at least one maneuvering path, and communication means for transmitting said periodic messages and said digital representation to said at least one autonomous agricultural robot.

BRIEF DESCRIPTION OF THE DRAWINGS

The present invention will be better understood on reading the detailed description of a non-limiting example of the invention which follows, with reference to the appended drawings, where.

DETAILED DESCRIPTION

Figure 1:
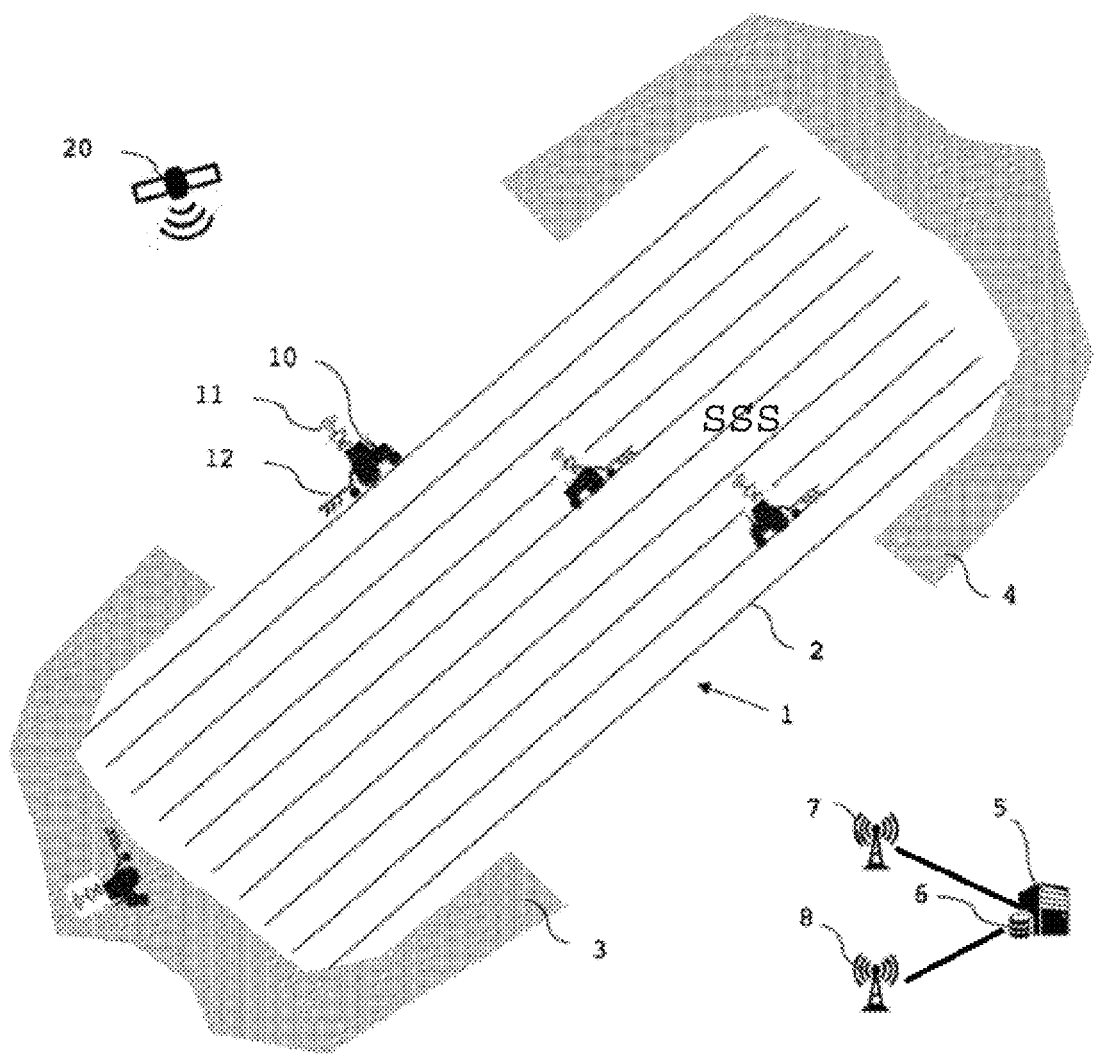
FIG. 1 shows a schematic view of a system for implementing the invention.

The system according to the invention illustrated in FIG. 1 relates to working an area organized into a plurality of rows (2) with, at the end of the rows (2), turning areas (3, 4) located between the cultivable area and the movement boundaries of the agricultural machinery defined by the roadways, ditches, hedges and embankments bordering the cultivable area.

The plot of land for cultivation is structured in lines oriented so as to reduce maneuvers. The interval between two adjacent lines is generally constant, but may present variations locally to take account of specific features of the terrain. These lines are straight as far as possible, but may present curvatures locally. They define the passage rows for the agricultural machinery, for work such as plowing, sowing, weeding, harvesting, spraying various compounds, etc.

The topology of the plot is calculated by a server (5) by optimization processing operations and recorded in a memory (6) of the server in the form of a digital map comprising geolocated information relating to the rows (2) and the turning areas (3, 4).

The system also comprises autonomous machines (10) towing a work hitch (12) having a reference point (15). Each of the autonomous machines (10) is equipped with its own geolocation means (11), for example by a satellite geolocation system (20). It also comprises fixed beacons (small sensor housings) (7, 8).

The supervisor calculates the movement trajectories of each of the autonomous machines (10), and transmits the necessary information to the autonomous machines (10) to ensure that the allocated trajectory is followed according to the geolocation data received locally by each of the machines.

In the event that the machine (10) deviates with respect to the nominal trajectory, the trajectory on the plot is calculated according to the allocated row. For each of the machines, the supervisor also calculates one or more maneuvering paths between a row and the next allocated row and transmits them to the concerned machine to enable it to control the movement between the end of a row (15) and the start of the row allocated for the subsequent movement.

Movement while Working a Row

Figure 2:
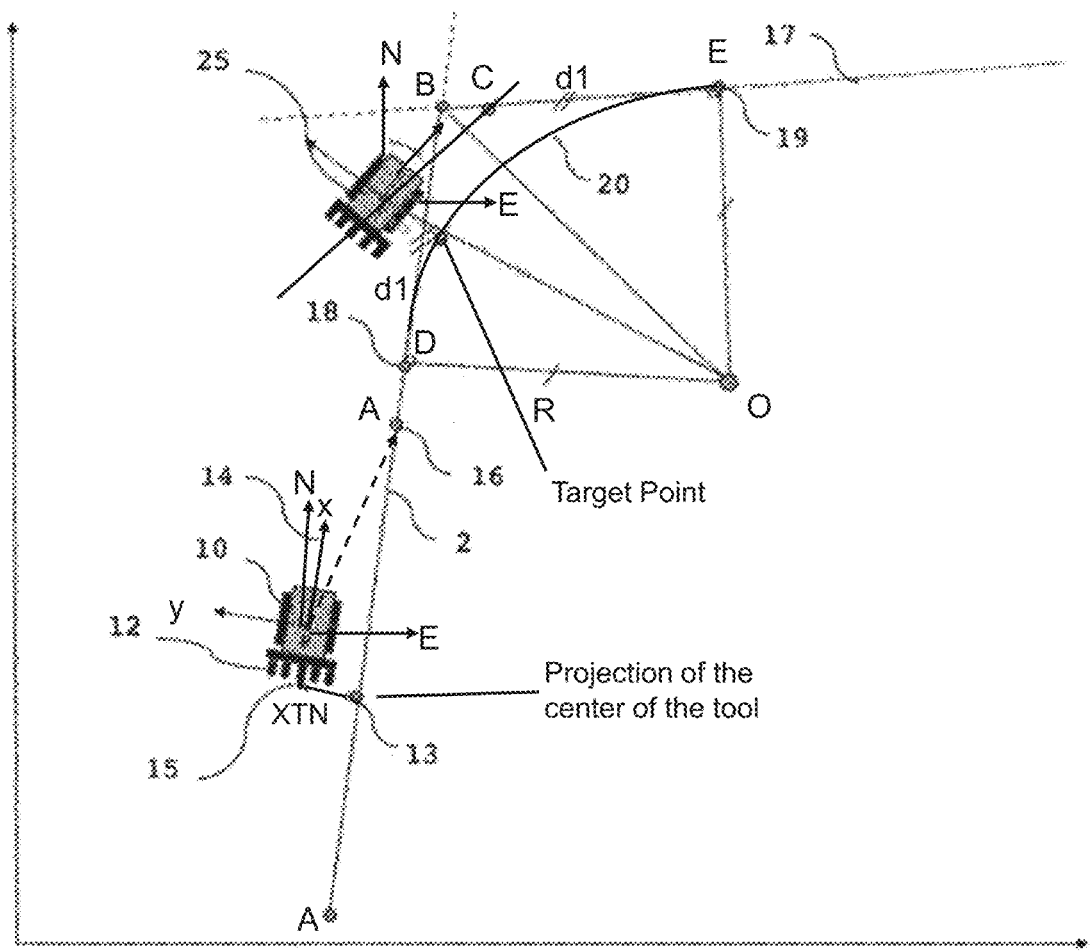
FIG. 2 illustrates the movement of an autonomous machine.

FIG. 2 illustrates the movement of the machine (10).

Movement on a Row

When the robot moves in reference to a row (2) allocated to it, the on-board guidance system computer controls the minimization of the deviation between:
- a reference point (25) at the center of the machine (10) on the one hand, and
- the orthogonal projection (13) with respect to the longitudinal plane (14) of this reference point (25) on the digital representation of the row (2)

The tool is in an active or inactive state depending on the instruction corresponding in particular to the nature of the work depending on the location of the robot. The computer of the machine (10) calculates a correction to return to the point (16) of the nominal trajectory.

Definitions

In the remainder of the description, certain terms will be used in the particular context of the patent:

"Maneuvering path" designates the reference movement line linking the starting row to the end row. This guide path will serve as a reference for guiding the robot, and in particular as a reference for measuring the deviation between the actual position and the setpoint position.

"Maneuvering trajectory" designates the combination of the maneuvering path and the speed setpoint at each point of the path.

"Maneuvering route" designates a line crossing the maneuvering area and corresponding to a preferential line remaining inside the maneuvering polygon. This maneuvering route is optional and simplifies the calculation of the maneuvering path.

"Constrained optimization" designates a family of digital processing based on the analytical or digital resolution of problems that consist in minimizing or maximizing a criterion function on a set.

Moving Outside a Row

When the robot arrives at the end of a row (18), it controls the passage of the tool (12) to the inactive state, and modifies its guidance control strategy to switch to a mode for determining the trajectory by a constrained optimization algorithm, in real time or precomputed.

Modeling of Row Change Guidance

The preparation of the data to determine the trajectory outside the rows consists in defining a digital representation of the georeferenced polygons (20) defining the maneuvering area and whose perimeter delimiting the movement boundaries (19) in which the surfaces that are swept by the robot and its associated equipment during the movements thereof between two consecutive rows must remain circumscribed, which constitutes the first constraint.

This digital representation also comprises, for each of the rows, the position and the orientation of the beginning of the row (17).

A second constraint is that the trajectory in the maneuvering area ends at the start of the next row, with the same orientation as that of said start of row.

The possible maneuvering paths in view of these constraints are infinite, and the constrained optimization processing consists in selecting at least one of them further allowing weighted criteria to be satisfied, such as:
- minimizing travel time, depending on the length of the maneuvering path and the radii of curvature, as well as the maximum speed compatible with each of the radii of curvature and, where applicable, other parameters intrinsic to the robot and associated equipment
- maximizing the radius of curvature, which can be assigned a weighting coefficient lower than that assigned to the criterion for minimizing the travel time, an excessively small radius of curvature leading to soil degradation, in particular for tracked robots
- minimizing the cultivation surface crossed by the bearing surface on the ground generated by the movement of the robot on said maneuvering path, in order to limit the crushing of cultivated surfaces crossed by the robot.

Maneuvering Path Option

Optionally, the robot's computer loads one or more maneuvering paths into the memory of the robot's local computer, and one of the paths is selected, either by a human operator, or by a message transmitted by the supervisor, or by an algorithmic choice made by the robot's computer according to the maneuvering area available.

A maneuvering path consists of a succession of straight or curved sections (2 to 5). Each section (2 to 5) is defined by the geographic coordinates of the end points and the angular orientation of the tangents to said ends.

Typology of Trajectories

The trajectory typology library can be described by representations identified according to their main descriptors.

These are identified by a sequence of three letters, which can be C for an arc of a circle or S for a straight segment. In addition, a fourth letter is added to know if the path contains a reverse portion, which will be D if there is none or R if there is.

In all cases, the entry into the trajectory and the exit from it take place substantially parallel or at 90° and in opposite directions, and in forward motion.

The trajectories are classified into three categories, in which the paths are ordered:

Desirable paths, which are the paths the user wants to see as much as possible.

Possible paths are the paths that the user agrees to see in constrained cases.

Prohibited paths that the user does not wish to see appear in any case.

The classification is only a proposal that can be modified according to technical specifications, users, tools or the like.

Typologies of Desirable Trajectories:
ID 0: "U" shaped trajectory designated by type SCS_D (a straight segment, a 180° curve, a new straight segment, without any reverse)
ID 1: CSC_D trajectory: a 90° curve, a straight segment, followed by a new 90° curve, without any reverse Typologies of Possible Trajectories:
ID 2: CCS_R trajectory: a 135° curved trajectory, a cusp with a reverse direction following a second 45° curve, a straight segment in the forward direction.
ID 3: CCS_R trajectory: a trajectory a 30° curved trajectory, a cusp with a reverse direction following a second 90° curve, a straight segment in the forward direction.
ID 4: CCC_R trajectory: a trajectory a 35° curved trajectory to the left, a cusp with a reverse direction following a second 60° curve, a 60° curve in the forward direction.
ID 5: CCC_R trajectory: a trajectory a 45° curved trajectory to the right, a cusp with a reverse direction following a second 60° curve, a 45° curve in the forward direction.
ID 6: CCS_D trajectory: a trajectory having a first curve of more than 270°, a second curve according to a curve in the opposite direction followed by a straight segment
ID 7: CCC_D trajectory: a trajectory having a first curve of 45°, a second curve of more than 180° in the opposite direction followed by a third curve in the opposite direction
ID 8: SCS_R trajectory: a trajectory having a first rectilinear segment, followed by a cusp and a reverse direction according to a first 90° curve, and a new cusp followed by a rectilinear segment Typologies of Prohibited Trajectories:
ID 9: CCS_D trajectory: a trajectory with two consecutive curves and a rectilinear segment with a trajectory overlap
ID 10: CCC_D trajectory: a trajectory having three consecutive curves with a trajectory overlap
ID 11: CSC_R trajectory: a trajectory having an entry curve, a cusp, a rectilinear segment perpendicular to the entry and exit axis, and a new cusp followed by a new curve.

The DRS path selection algorithm proceeds as follows:

Over a first range of radii, the algorithm only tests whether there are valid desirable paths by gradually decreasing the radius.

Over a second range of radii smaller than the first, the algorithm tests whether there are valid desirable or possible paths by gradually decreasing the radius.

The invention claimed is:

1. A method for control by a supervisor of at least one autonomous agricultural robot comprising geolocation means, said supervisor transmitting periodic row allocation messages to said at least one autonomous agricultural robot, each of said agricultural robots comprising a computer for controlling the movement of the corresponding robot as a function, on the one hand, of an allocated trajectory and, on the other hand, of geolocation data, as well as for calculating a row change trajectory as a function of the messages transmitted by said supervisor, wherein said supervisor transmits a digital message describing boundaries of a maneuvering area comprising at least one polygon and in that the method comprises calculating movement of said robot:
when moving on a row by a guiding law by minimizing a deviation between
a center of the robot; and
a projection of the center of the robot on the row;
when moving outside a row during use by a guiding law by minimizing a deviation between
the center of the robot; and
a projection of the center of the robot on a maneuvering path;
said maneuvering path being determined by constrained optimization of a maneuvering trajectory, said constraints comprising:
the orientation of the end of the maneuvering path corresponds to the orientation of the start of the next row; and
an area traveled by a set of mobile elements is strictly inscribed in said maneuvering area polygon;
the optimization criterion consisting of the weighted combination of at least part of the following parameters:
minimizing the travel time of said maneuvering path;
maximizing turning radii;
minimizing a cultivation surface crossed by a bearing surface on the ground generated by the movement of the robot on said maneuvering path; and
conformity to a typology of a preferred trajectory from a library of trajectory typologies.

2. The method for control by a supervisor of at least one autonomous agricultural robot according to claim 1, wherein it further comprises a digital message describing at least one maneuvering route consisting of a succession of segments $S_i$ each defined by a downstream point $PAV_i$, an upstream point $PAM_i$ corresponds to the point $PAV_{i+1}$ of the following segment $S_{i+1}$, said optimization criterion for minimizing the cultivation surface crossed being determined as a function of the deviation between the maneuvering path and the maneuvering route.

3. The method for control by a supervisor of at least one autonomous agricultural robot according to claim 1, wherein said trajectory during movement outside the row is a function of the following parameters:
the tangent to the exit row;
the tangent to the allocated row;
said maneuvering path; and
boundaries of the authorized movement area.

4. The method for control by a supervisor of at least one autonomous agricultural robot according to claim 1, wherein said trajectory during movement outside the row comprises at least one inversion of the movement direction.

5. The method for control by a supervisor of at least one autonomous agricultural robot according to claim 1, wherein said trajectory during movement outside the row is calculated to present at least one asymptote approaching the boundary of the authorized movement area.

6. The method for control by a supervisor of at least one autonomous agricultural robot according to claim 1, wherein said trajectory during movement outside the row is calculated to maximize the distance between the boundary of the authorized movement area and an asymptote of said trajectory.

7. The method for control by a supervisor of at least one autonomous agricultural robot according to claim 1, wherein said trajectory during movement outside the row is calculated to minimize the length of said trajectory.

8. The method for control by a supervisor of at least one autonomous agricultural robot according to claim 1, wherein said trajectory during movement outside the row is calculated to maximize the radii of curvature of said trajectory.

9. The method for control by a supervisor of at least one autonomous agricultural robot according to claim 1, wherein said supervisor transmits a plurality of maneuvering paths and in that the robot selects one of said maneuvering paths during the step of calculating said row change trajectory.

10. The method for control by a supervisor of at least one autonomous agricultural robot according to claim 1, wherein said computer for controlling the movement of the robot comprises a controller determining, in real time, the direction and the speed of movement as a function of the offset between a reference point of the robot and the calculated trajectory, with different coefficients for the movement on a row on the one hand, and for movement outside a row on the other hand.

11. The method for control by a supervisor of at least one autonomous agricultural robot according to claim 10, wherein said coefficients are adjusted according to the use of the tool and the nature of the ground.

12. The method for control by a supervisor of at least one autonomous agricultural robot according to claim 1, wherein said supervisor transmits a digital message describing a plurality of maneuvering paths, and in that it comprises a step of selecting one of said paths.

13. A precision land management system comprising a supervisor and at least one autonomous agricultural robot comprising geolocation means, wherein said supervisor transmits periodic row allocation messages to said at least one autonomous agricultural robot, each of said agricultural robots comprising a computer for controlling the movement of the corresponding robot as a function, on the one hand, of an allocated trajectory and, on the other hand, of geolocation data, as well as for calculating a row change trajectory as a function of the messages transmitted by said supervisor, wherein said supervisor transmits a digital message describing boundaries of a maneuvering area comprising at least one polygon, and calculates movement of said robot
when moving on a row by a guiding law by minimizing
a deviation between
a center of the robot; and
a projection of the center of the robot on the row;
when moving outside a row during use by a guiding law by minimizing the deviation between
the center of the robot; and
a projection of the center of the robot on a maneuvering path
said maneuvering path being determined by constrained optimization of a maneuvering trajectory, said constraints comprising:
the orientation of the end of the maneuvering path corresponds to the orientation of the start of the next row; and
an area traveled by a set of mobile elements is strictly inscribed in said maneuvering area polygon;
the optimization criterion consisting of the weighted combination of at least part of the following parameters:
minimizing the travel time of said maneuvering path;
maximizing turning radii;
minimizing a cultivation surface crossed by a bearing surface on the ground generated by the movement of the robot on said maneuvering path; and
conformity to a typology of a preferred trajectory from a library of typologies.

14. A supervisor of autonomous agricultural robots comprising geolocation means, the supervisor comprising:
a computer for calculating periodic row allocation messages to each of said agricultural robots and a digital representation of at least one maneuvering path, and for calculating movement of each of said agricultural robots:
when moving on a row by a guiding law by minimizing
a deviation between
a center of the robot; and
a projection of the center of the robot on the row;
when moving outside a row during use by a guiding law by minimizing the deviation between
the center of the robot; and
a projection of the center of the robot on a maneuvering path
said maneuvering path being determined by constrained optimization of a maneuvering trajectory, said constraints comprising:
the orientation of the end of the maneuvering path corresponds to the orientation of the start of the next row; and
an area traveled by a set of mobile elements is strictly inscribed in said maneuvering area polygon;
the optimization criterion consisting of the weighted combination of at least part of the following parameters:
minimizing the travel time of said maneuvering path;
maximizing turning radii;
minimizing a cultivation surface crossed by a bearing surface on the ground generated by the movement of the robot on said maneuvering path; and
conformity to a typology of a preferred trajectory from a library of typologies; and;
communication means for transmitting said periodic messages and said digital representation to said at least one autonomous agricultural robot.

* * * * *